Figure 1:
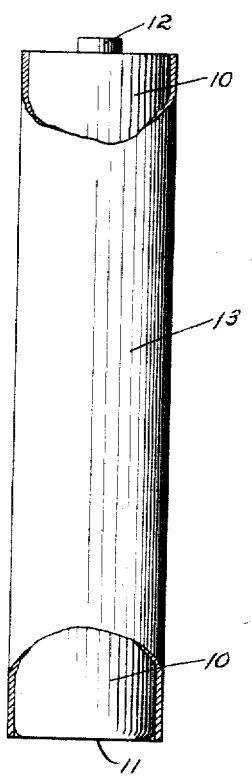

A. S. LYHNE.
FLASH LIGHT BATTERY.
APPLICATION FILED AUG. 11, 1917.

1,307,868.

Patented June 24, 1919.

INVENTOR
Anker S. Lyhne
BY
A. M. Wooster
ATTORNEY

UNITED STATES PATENT OFFICE.

ANKER S. LYHNE, OF BRIDGEPORT, CONNECTICUT.

FLASH-LIGHT BATTERY.

1,307,868.

Specification of Letters Patent. Patented June 24, 1919.

Application filed August 11, 1917. Serial No. 185,684.

*To all whom it may concern:*

Be it known that I, ANKER S. LYHNE, a citizen of the United States, residing at Bridgeport, county of Fairfield, State of Connecticut, have invented an Improvement in Flash-Light Batteries, of which the following is a specification.

This invention relates to dry cell batteries, so-called, and has for its object to so improve the zinc elements of these batteries as to prevent leakage and to insure their being of standard size.

With these and other objects in view I have devised the novel zinc element for dry cell batteries which I will now describe referring to the accompanying drawing forming a part of this specification and using reference characters to indicate the several parts.

Figure 2:
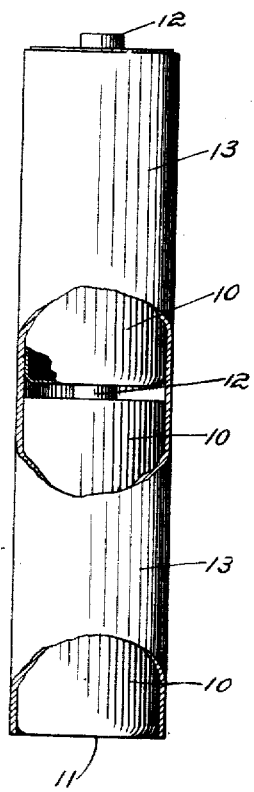
Figure 3:
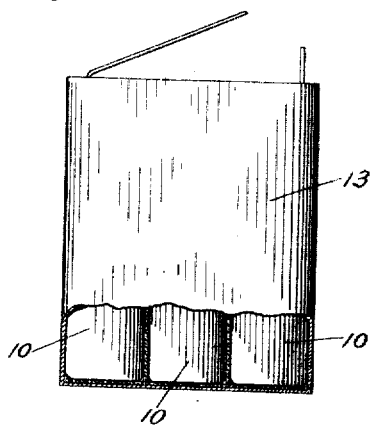
Figure 4:
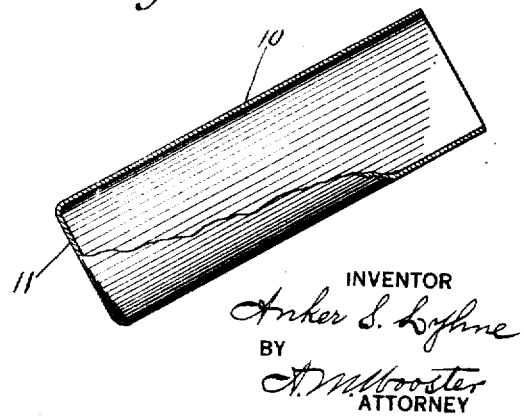

Figures 1 and 2 are elevations, partly broken away, of standard two cell batteries with my novel zinc elements;

Fig. 3 an elevation, partly broken away, showing a three cell battery of another type provided with my novel zinc elements, and Fig. 4 is an elevation, partly broken away, of the zinc element detached.

In dry cell flash light batteries, as ordinarily constructed, the zinc elements consist of elongated cups formed by bending a sheet of zinc of the proper size to tubular form, soldering the edges together, and then soldering a zinc bottom in place. The two most important objections to zinc elements constructed in this manner are first, the loss caused by leakage at the side and bottom seams, which causes the deterioration of many batteries and not infrequently complete loss of the battery, and second, the inconvenience resulting from the fact that it is extremely difficult, in fact almost impossible, to make them of standard size. In assembling dry cell flash light batteries, the zinc elements are usually required to fit standard tubes, cartons, etc. If the zinc elements are slightly under a close fit they are liable to drop out and if a number of cells are placed in the same tube, without necessarily dropping out they are apt to drop away from each other sufficiently to prevent perfect electrical connection between the respective head and base contacts of the cells, and if they are slightly too large and fit too closely in the tubes so that they require to be pushed hard to insert them they are apt to spring slightly away from each other, which will likewise prevent perfect electrical connection between the respective head and base contacts of the cells.

I have found that by making the cup shaped zinc elements integral, that is by drawing and forming the cups from disks of sheet zinc I am enabled to wholly overcome these objections and to produce non-leaking zinc elements without soldering together of parts and to make them of standard size, so that they will all fit equally well in standard tubes and cartons, which effects an appreciable saving in the cost of construction and furthermore greatly improves the appearance, the quality and the life of the batteries, as the danger of leakage and of imperfect electrical connection between the head and base contacts is eliminated.

Referring to the drawing, 10 denotes my novel zinc element which is formed to cup shape and has an integral bottom 11. 12 denotes the head contact which is seated in the open end of the cup and is secured in place in the usual manner and 13 a standard tube, or carton, of insulating material which receives two or more of the cells.

A positive electrode element of the character herein described formed of a tubular body of drawn zinc having integral bottom and side walls as described, possesses many advantages over the old type of electrode provided with soldered seams. For instance, the shell is made in one piece and it is possible to utilize the entire surface, both sides and bottom for electrolytic action, thereby greatly increasing the life of the battery. Where soldered shells are used, the bottoms cannot be utilized for electrolytic action because, in order to get enough life out of the battery to make it salable, a paraffined paper washer must be put in the bottom of the cup. This adds somewhat to the life of the battery by preventing electrolysis at the seams. But the gain in protection at the seams results in a loss of the available surface for electrolytic action. The battery with the one piece shell has greater recuperation and much longer life than the soldered type.

Another advantage gained is that resulting in the treatment imparted to the zinc as a necessary part of the drawing operation. The old type zinc shells are made from sheet zinc rolled up and soldered at the edges and with a bottom soldered in position. Thus there is an added danger both at the sides and bottom of imperfect soldering, and even if the soldering is practically perfect, electrolysis is bound to set up at the seams much quicker than if the seams were not there. Aside from this however, the rolling of the sheet zinc in the manufacture of the old type of shells has the effect of arranging the fibers longitudinally, leaving thin places in the metal. The action of the battery, as is well known, is an eating away process, and these thin spots are attacked and frequently give out. In the several drawing operations incident to the making of the one piece shell therein described, the fibers of the metal are worked together in such a way as to make a homogeneous mass of the metal. This is not due to any special treatment but is the natural result of the drawing operations. Thus the re-working of the metal reduces the liability of producing thin places in the shell, thereby greatly increasing the life of the battery.

Another advantage over the soldered seam casing is that all seamed batteries are likely to give out at the seams or at the thin places in the bodies, a condition which cannot take place in the seamless shell. Thus a battery provided with the seamless shell will die through exhaustion but not from the breaking down of the shell itself. This is of particular advantage when the battery is to be removed from the flash light case because where the battery gives out by breaking away, the liquid in the body escapes and causes the battery to swell so that it cannot be removed from the case. The seamless shell not only overcomes this difficulty, but also possesses the additional advantage that the shells may all be made of uniform dimensions so that they may be readily slipped into and removed from the flash light case.

Having thus described my invention, I claim:—

1. As an article of manufacture positive electrode element for flash light batteries comprising a tubular body of drawn sheet zinc having integral bottom and side walls.

2. As an article of manufacture positive electrode element for flash light batteries comprising a tubular seamless and jointless body of drawn sheet zinc and of uniform diameter.

In testimony whereof I affix my signature.

ANKER S. LYHNE.